United States Patent
Ito et al.

(10) Patent No.: US 11,245,127 B2
(45) Date of Patent: Feb. 8, 2022

(54) CARBON DIOXIDE ELECTROLYSIS/CARBON FUEL CELL-INTEGRATED APPARATUS

(71) Applicant: I'MSEP CO., LTD., Kyoto (JP)

(72) Inventors: Yasuhiko Ito, Kyoto (JP); Tokujiro Nishikiori, Kyoto (JP); Hiroyuki Watanabe, Kyoto (JP)

(73) Assignee: I'MSEP CO., LTD., Kyoto (JP)

( * ) Notice: Subject to any disclaimer, the term of this patent is extended or adjusted under 35 U.S.C. 154(b) by 251 days.

(21) Appl. No.: 16/617,795

(22) PCT Filed: Aug. 24, 2017

(86) PCT No.: PCT/JP2017/030397
§ 371 (c)(1),
(2) Date: Nov. 27, 2019

(87) PCT Pub. No.: WO2019/038895
PCT Pub. Date: Feb. 28, 2019

(65) Prior Publication Data
US 2020/0112045 A1    Apr. 9, 2020

(51) Int. Cl.
*H01M 8/20* (2006.01)
*C25B 1/00* (2021.01)
*H01M 8/0612* (2016.01)
*H01M 8/14* (2006.01)

(52) U.S. Cl.
CPC .......... *H01M 8/20* (2013.01); *C25B 1/00* (2013.01); *H01M 8/0618* (2013.01); *H01M 8/145* (2013.01); *H01M 2008/147* (2013.01); *H01M 2300/0051* (2013.01); *H01M 2300/0054* (2013.01)

(58) Field of Classification Search
CPC ...... H01M 8/20; H01M 8/0618; H01M 8/145; H01M 2008/147; H01M 2300/0051; H01M 2300/0054
See application file for complete search history.

(56) References Cited

U.S. PATENT DOCUMENTS

| 9,780,424 B2 | 10/2017 | Graves et al. |
| 10,756,358 B2 * | 8/2020 | Hilmi ................ H01M 8/145 |
| 2015/0050579 A1 | 2/2015 | Ran et al. |
| 2017/0012294 A1 * | 1/2017 | Donne ............... H01M 4/9016 |

(Continued)

FOREIGN PATENT DOCUMENTS

| CN | 101540411 A | 9/2009 |
| JP | 2006196268 A | 7/2006 |

(Continued)

OTHER PUBLICATIONS

Translation of PCT JP 2017/030397 written opinion (no date).*
International Search Report PCT/JP2017/030397 dated Oct. 31, 2017 (pp. 1-4).

*Primary Examiner* — Amanda C. Walke
(74) *Attorney, Agent, or Firm* — Millen White Zelano and Branigan, PC; Csaba Henter

(57) ABSTRACT

Provided is a carbon dioxide electrolysis-carbon deposition/carbon fuel cell-integrated apparatus which enable interconversion between electric energy and chemical energy (electrodeposited carbon) through the use of an integrated electrochemical reaction system with a molten salt.

9 Claims, 5 Drawing Sheets

(56) References Cited

U.S. PATENT DOCUMENTS

| | | | |
|---|---|---|---|
| 2020/0176795 A1* | 6/2020 | Johnson | F02C 6/00 |
| 2020/0358111 A1* | 11/2020 | Hilmi | H01M 8/0295 |
| 2021/0151822 A9* | 5/2021 | Licht | H01M 12/08 |

FOREIGN PATENT DOCUMENTS

| | | | |
|---|---|---|---|
| JP | 2010003568 A | 1/2010 |
| JP | 2013237901 A | 11/2013 |
| JP | 2015534220 A | 11/2015 |
| JP | 2016089230 A | 5/2016 |

* cited by examiner

CARBON DIOXIDE ELECTROLYSIS/CARBON FUEL CELL-INTEGRATED APPARATUS

TECHNICAL FIELD

The present invention provides a carbon dioxide electrolysis-derived carbon deposition/carbon fuel cell-integrated apparatus including an electrolytic bath composed of a molten salt, a method for using the apparatus, a system including the integrated apparatus combined with a carbon dioxide gas storage unit, and a system including the integrated apparatus combined with a carbon storage unit, in particular, as a core, to a carbon dioxide electrolysis/carbon fuel cell-integrated apparatus which makes it possible to achieve, with the use of an integrated electrochemical reaction system, a balance between an electrodeposition reaction of carbon from carbon dioxide with the use of the electrolytic bath composed of a molten salt and an oxidation reaction of carbon proceeding in a direct carbon fuel cell (DCFC) which is a totally opposite reaction to the electrodeposition reaction.

BACKGROUND ART

Japan, which has ratified the "Paris Agreement" as an international framework for global warming countermeasures after 2020, has set a goal of halving global greenhouse gas emissions by 2050 as compared with the current situation.

For the achievement of this goal, in order to reduce carbon dioxide emissions, which account for most of greenhouse gases, it is necessary to make the best use of renewable energy such as sunlight and wind power. The output of foregoing renewable energy, however, varies significantly with change in weather conditions, and the role of thermal power generation capable of following the load without depending on weather conditions is important for the stabilization of the electric power system. As a contradiction, however, if the ratio of thermal power generation is increased for following the load, carbon dioxide emissions will be also increased. Meanwhile, there is Carbon dioxide Capture and Storage (CCS) cited as one of effective measures for the direct reduction of carbon dioxide, and for example, techniques have been studied in which a high concentration of carbon dioxide separated and collected from exhaust gas of a thermal power plant is stored in the ground or the like.

On the other hand, studies have been also progressed to make efficient use of collected carbon dioxide in a positive manner, rather than simply storing the carbon dioxide in the ground, but for example, Enhanced Oil Recovery (EOR) causes an increase in the amount of oil used, and in addition, in the case of using the carbon dioxide as synthetic raw materials for methanol, dimethyl ether, various polymers, and the like, hydrocarbon raw materials are required in addition to carbon, and hydrogen is also required as a reducing agent. There are many cases of resulting in leading to increased carbon dioxide emissions, and no promising technique has been found.

Meanwhile, the applicant has found that the use of a "molten salt" which is a functional liquid allows "electrolytic deposition of carbon" with carbon dioxide as a raw material. For example, when carbon dioxide is supplied to a molten salt in which oxygen ions (oxide ions, $O^{2-}$) are present, a carbon dioxide absorption reaction proceeds that produces carbonate ions ($CO_3^{2-}$) in accordance with the formula (1).

$$\text{In molten salt: } CO_2 + O^{2-} \rightarrow CO_3^{2-} \quad (1)$$

When this carbonate ion is reduced at a cathode, carbon is deposited on the cathode in accordance with the formula (2), and in this regard, various carbon electrodeposits from dense to porous electrodeposits can be obtained by controlling the electrolytic conditions.

$$\text{Cathodic reaction: } CO_3^{2-} + 4e^- \rightarrow C + 3O^{2-} \quad (2)$$

With the use of an insoluble anode, some of the produced oxide ions are oxidized on the anode to generate oxygen in accordance with the formula (3).

$$\text{Anodic reaction: } 2O^{2-} \rightarrow O_2 + 4e^- \quad (3)$$

The oxide ions remaining in the molten salt without being oxidized on the anode can be used in the carbon dioxide absorption reaction of the formula (1), and the formulas (1) to (3) can be summed up to the following reaction from carbon dioxide to carbon and oxygen.

$$\text{Total reaction: } CO_2 \rightarrow C + O_2 \quad (4)$$

On the other hand, the deposited carbon is produced by supplying electric power, and if electric power can be extracted with the use of this carbon as a fuel, a new energy storage system can be created, as in the case of using hydrogen produced by electrolysis of water. Various forms of direct carbon fuel cells (DCFC) that use solid carbon as a fuel have been proposed since the end of the 19-th century, and in recent years, research on the cells has been activated particularly from the viewpoint of high efficiency use of coal.

In DCFC, for example, as in the following formulas (5) and (6), the reduction of oxygen proceeds at the positive electrode, whereas the reaction of generating carbon dioxide from carbon and oxide ions occurs at the negative electrode, and the sum of the formulas results in the reaction of producing carbon dioxide from carbon and oxygen as in the following formula (7).

$$\text{Positive electrode reaction: } O_2 + 4e^- \rightarrow 2O^{2-} \quad (5)$$

$$\text{Negative electrode reaction: } C + 2O^{2-} \rightarrow CO_2 + 4e^- \quad (6)$$

$$\text{Total reaction: } C + O_2 \rightarrow CO_2 \quad (7)$$

For the solid "carbon fuel" currently used in DCFC, fine coke particles have been often used until now, and there are also cases in which carbon black is used as in Lawrence Livermore National Laboratory or carbon produced by hydrocarbon decomposition is used as in Tokyo Institute of Technology, but carbon obtained from carbon dioxide by the above-mentioned molten salt electrolysis is also expected to be usable as such a carbon fuel.

As described above, the electrodeposition reaction of carbon from carbon dioxide and the oxidation reaction of carbon which proceeds in the direct carbon fuel cell (DCFC), which are totally opposite reactions, are considered capable of creating an apparatus that enables interconversion between electric energy and chemical energy (electrolytic product) through the same electrochemical system, such as a water electrolysis/fuel cell-integrated apparatus in which hydrogen obtained by electrolysis of water is used as a fuel for fuel cell.

Unlike the electrolysis of water (hydrogen generation reaction), however, the electrodeposition reaction of carbon from carbon dioxide deposits the residual electrolytic product on the electrode as a solid (carbon) rather than a gas (hydrogen) which is easily separated and collected, and thus, no attempt has been made to use the product (electrodeposited carbon) as a fuel for fuel cell.

CITATION LISTS

Patent Literature

Patent Literature 1: JP 2010-53425 A

Non Patent Literatures

Non Patent Literature 2: N. J. Cherepy, R. Krueger, K. J. Fiet, A. F. Jankowski, and J. F. Cooper, Journal of The Electrochemical Society, 152 (1), A 80 (2005).
Non Patent Literature 3: Ihara Manabu, Hydrogen Energy System, 36 (2), 17 (2011).

SUMMARY OF INVENTION

Technical Problem

Thus, an object of the present invention is to provide a carbon dioxide electrolysis-derived carbon deposition/carbon fuel cell-integrated apparatus, a method for using the apparatus, a system including the integrated apparatus combined with a carbon dioxide gas storage unit, and a system including the integrated apparatus combined with a carbon storage unit, which enable interconversion between electric energy and chemical energy (electrodeposited carbon) through the use of an integrated electrochemical reaction system with an electrolytic bath composed of a molten salt.

Solution to Problem

As a result of intensive studies on the configurations of carbon deposition by a carbon dioxide electrolysis apparatus and a carbon fuel cell and the reaction systems therefor, the inventors have focused on the fact that the reaction system expressed by the above-mentioned formulas (1) to (4) for immobilizing and storing carbon dioxide as carbon is totally opposite to the reaction system expressed by the formulas (5) to (7) for extracting electric power with carbon as a fuel, thereby finding that it is most effective to cause these reactions to proceed through the use of an integrated electrochemical reaction system with an electrolytic bath composed of a molten salt for creating a carbon dioxide electrolysis/carbon fuel cell-integrated apparatus, and then achieving the present invention.

More specifically, according to the present invention, provided is a carbon dioxide electrolysis/carbon fuel cell-integrated apparatus including: an electrolytic bath that houses a molten salt containing oxide ions; a carbon deposition fuel electrode that is at least partially immersed in the molten salt; an oxygen gas generation electrode that is at least partially immersed in the molten salt to be electrically connected to the carbon deposition fuel electrode; an oxygen gas reduction electrode that is at least partially immersed in the molten salt; a carbon dioxide gas supply unit that supplies a carbon dioxide-containing gas into the molten salt to produce carbonate ions; a power supply that applies, between the carbon deposition/combustion electrode and the oxygen gas generation electrode, a voltage at which the carbonate ions are reduced to deposit carbon on the carbon deposition fuel electrode; and an oxygen gas supply unit that supplies an oxygen-containing gas to the oxygen gas reduction electrode to generate oxide ions in the molten salt.

When the carbon dioxide electrolysis/carbon fuel cell-integrated apparatus according to the present invention functions as a carbon dioxide electrolysis apparatus that fixes and stores carbon dioxide as carbon by molten salt electrolysis, the supply of carbon dioxide to the molten salt with ions of oxygen (oxide ions, $O^{2-}$) therein by the use of the carbon dioxide gas supply unit causes a carbon dioxide absorption reaction of producing carbonate ions ($CO_3^{2-}$) in accordance with the formula (1) to proceed in the electrolytic bath.

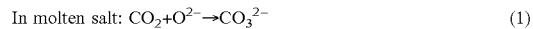

In molten salt: $CO_2 + O^{2-} \rightarrow CO_3^{2-}$ (1)

When the carbonate ions are reduced at the carbon deposition fuel electrode at least partially immersed in the molten salt, carbon is deposited on the carbon deposition/combustion electrode in accordance with the formula (2), and in this regard, various carbon electrodeposits from dense to porous electrodeposits can be obtained by controlling the electrolytic conditions with the power supply that applies a voltage between a cathode and an anode as described later.

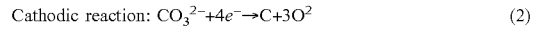

Cathodic reaction: $CO_3^{2-} + 4e^- \rightarrow C + 3O^{2-}$ (2)

Some of the produced oxide ions are oxidized on the oxygen gas generation electrode electrically connected to the carbon deposition fuel electrode described above to produce oxygen in accordance with the formula (3).

Anodic reaction: $2O^{2-} \rightarrow O_2 + 4e^-$ (3)

The oxide ions remaining in the molten salt without being oxidized on the anode can be used in the carbon dioxide absorption reaction of the formula (1), and the formulas (1) to (3) can be summed up to the following reaction from carbon dioxide to carbon and oxygen.

Total reaction: $CO_2 \rightarrow C + O_2$ (4)

For this reason, in order to function as a carbon dioxide electrolysis apparatus that fixes and stores carbon dioxide as carbon, it is necessary for the carbon dioxide electrolysis/carbon fuel cell-integrated apparatus according to the present invention to include: an electrolytic bath that houses a molten salt containing oxide ions; a carbon dioxide gas supply unit that supplies a carbon dioxide-containing gas into the molten salt to produce carbonate ions; a carbon deposition fuel electrode that is at least partially immersed in the molten salt; an oxygen gas generation electrode that is at least partially immersed in the molten salt to be electrically connected to the carbon deposition fuel electrode; a power supply that applies, between the carbon deposition fuel electrode and the oxygen gas generation electrode, a voltage at which the carbonate ions are reduced to deposit carbon on the carbon deposition fuel electrode; and an oxygen gas supply unit that supplies an oxygen-containing gas to the oxygen gas reduction electrode to generate oxide ions in the molten salt.

Further, in the carbon dioxide electrolysis/carbon fuel cell-integrated apparatus according to the present invention, since oxygen gas is generated at the oxygen gas generation electrode which serves as a cathode (see the formula (2)), an oxygen gas collection unit is preferably provided which efficiently collects the oxygen gas generated at the electrode. This case has the advantage that the collected oxygen gas can be reused, for example, for the reaction shown by the formula (5), and the like.

Meanwhile, when the carbon dioxide electrolysis/carbon fuel cell-integrated apparatus according to the present invention functions as a carbon fuel cell that extracts electric power with carbon as a fuel, the supply of an oxygen-containing gas by the oxygen gas supply unit to the oxygen gas reduction electrode which serves as a positive electrode causes the reduction of oxygen to proceed at the positive electrode in accordance with the formula (5) in the electrolytic bath.

$$\text{Positive electrode reaction: } O_2 + 4e^- \rightarrow 2O^{2-} \qquad (5)$$

Further, at the carbon deposition fuel electrode electrically connected to the oxygen gas reduction electrode, which serves as a negative electrode, carbon dioxide is produced from the carbon of the carbon deposition fuel electrode and oxide ions in the molten salt in accordance with the formula (6).

$$\text{Negative electrode reaction: } C + 2O^{2-} \rightarrow CO_2 + 4e^- \qquad (6)$$

The sum of the formulas (5) and (6) results in the reaction of producing carbon dioxide from carbon and oxygen as in the following formula (7).

$$\text{Total reaction: } C + O_2 \rightarrow CO_2 \qquad (7)$$

For this reason, in order to function as a carbon fuel cell that extracts electric power with carbon as a fuel, it is necessary for the carbon dioxide electrolysis/carbon fuel cell-integrated apparatus according to the present invention to include: an electrolytic bath that houses a molten salt containing oxide ions; an oxygen gas reduction electrode that is at least partially immersed in the molten salt; a carbon deposition fuel electrode that is at least partially immersed in the molten salt to be electrically connected to the oxygen gas reduction electrode; and an oxygen gas supply unit that supplies an oxygen-containing gas to the oxygen gas reduction electrode to generate oxide ions in the molten salt.

Further, in the carbon dioxide electrolysis/carbon fuel cell-integrated apparatus according to the present invention, since carbon dioxide gas is generated at the carbon deposition fuel electrode which serves as a negative electrode (see the formula (6)), a carbon dioxide gas collection unit is preferably provided which efficiently collects the carbon dioxide gas generated at the electrode.

As described above, the carbon dioxide electrolysis/carbon fuel cell-integrated apparatus according to the present invention is characterized by being capable of implementing, as a method for using the apparatus, two steps involving totally opposite reactions of: a carbon electrodeposition step of supplying the carbon dioxide-containing gas from the carbon dioxide gas supply unit into the molten salt, and applying, between the carbon deposition fuel electrode and the oxygen gas generation electrode, a voltage at which the carbonate ions are reduced to deposit carbon on the carbon deposition fuel electrode, with the power supply; and further a power generation step of supplying an oxygen-containing gas from the oxygen gas supply unit to the oxygen gas reduction electrode to produce oxide ions in the molten salt, and generating a carbon dioxide gas on the carbon deposited on the carbon deposition fuel electrode.

The carbon deposition fuel electrode for use in the present invention may be separate from the electrolytic bath, like an electrode rod that is immersed in the molten salt in the electrolytic bath, or may be integrated with the electrolytic bath so as to constitute at least a part of an inner wall of the electrolytic bath.

According to the present invention, it is preferable to contain at least one of an alkali metal halide and an alkaline earth metal halide as a molten salt which makes carbonate ions ($CO_3^{2-}$) and oxide ions ($O^{2-}$) present stably in the electrolytic bath.

According to the present invention, if a system is configured to be provided with a carbon dioxide gas storage unit that stores a carbon dioxide gas generated at the carbon deposition fuel electrode in addition to the above-described carbon dioxide electrolysis/carbon fuel cell-integrated apparatus, it becomes possible to store, in the ground, a high concentration of carbon dioxide gas (see the formula (7)) generated in the use of the system as a carbon fuel cell.

Alternatively, according to the present invention, if a system is configured to be provided with a carbon storage unit that stores carbon generated at the carbon deposition fuel electrode in addition to the above-described carbon dioxide electrolysis/carbon fuel cell-integrated apparatus, it becomes possible to use, as a solid fuel for carbon fuel cell (see the formula (7)) or a high-functional carbon materials, carbon (see the formula (4)) generated in the use of the system as a carbon dioxide electrolysis apparatus.

Advantageous Effects of Invention

According to the present invention, the carbon dioxide electrolytic apparatus that fixes and stores carbon dioxide as carbon and the carbon fuel cell that extracts electric power with carbon as a fuel, which are originally different in device configuration, can be integrated as a carbon dioxide electrolysis/carbon fuel cell-integrated apparatus, or a system including the integrated apparatus combined with a carbon dioxide gas storage unit and/or a carbon storage unit, which enables interconversion between electric energy and chemical energy (electrodeposited carbon) through the use of an integrated electrochemical reaction system with an electrolytic bath composed of a molten salt.

In addition, according to the present invention, it becomes possible to implement, through an integrated electrochemical reaction system with an electrolytic bath composed of a molten salt, the two steps involving totally opposite reactions of: the carbon electrodeposition step of supplying the carbon dioxide-containing gas from the carbon dioxide gas supply unit into the molten salt, and applying, between the carbon deposition fuel electrode and the oxygen gas generation electrode, a voltage at which the carbonate ions are reduced to deposit carbon on the carbon deposition fuel electrode, with the power supply; and further the power generation step of supplying an oxygen-containing gas from the oxygen gas supply unit to the oxygen gas reduction electrode to produce oxide ions in the molten salt, and generating a carbon dioxide gas on the carbon deposited on the carbon deposition fuel electrode.

DESCRIPTION OF EMBODIMENT

Hereinafter, a carbon dioxide electrolysis/carbon fuel cell-integrated apparatus according to an embodiment of the present invention, a method for using the apparatus, a system including the integrated apparatus combined with a carbon dioxide gas storage unit, and a system including the integrated apparatus combined with a carbon storage unit will be described in detail with reference to the drawings. It is to be noted that the present invention is not to be considered limited to the examples presented below, and various modifications can be made without departing from the technical concept of the present invention.

Figure 1:
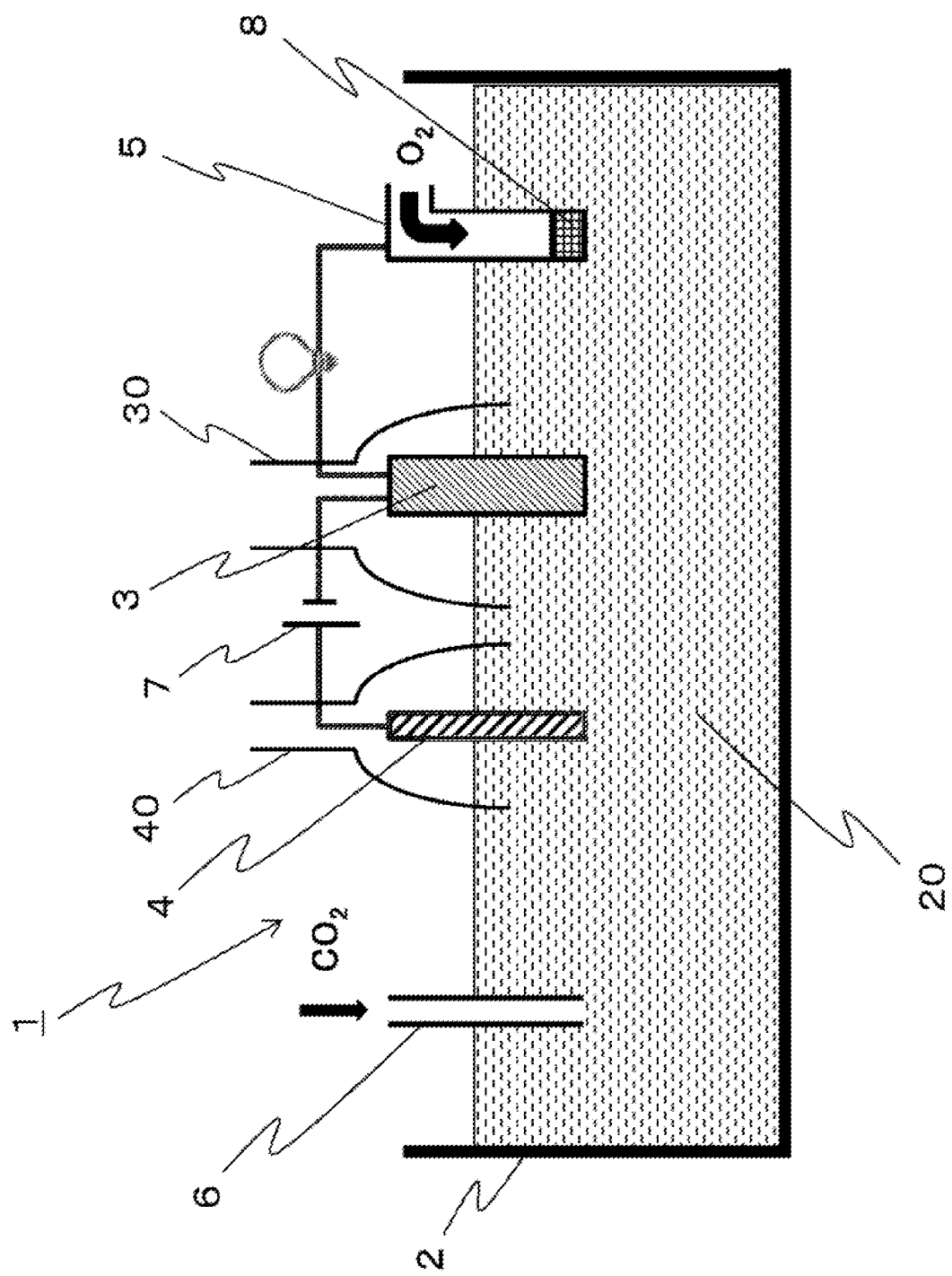
FIG. 1 is a schematic view schematically illustrating a carbon dioxide electrolysis/carbon fuel cell-integrated apparatus according to an embodiment of the present invention.

FIG. 1 shows a schematic view schematically illustrating a carbon dioxide electrolysis/carbon fuel cell-integrated apparatus 1 according to an embodiment of the present invention.

As understood with reference to FIG. 1, the carbon dioxide electrolysis/carbon fuel cell-integrated apparatus 1 according to the present embodiment includes an electrolytic bath 2 that houses a molten salt 20 containing oxide ions. In the electrolytic bath 2, each of a carbon deposition/combustion electrode 3, an oxygen gas generation electrode 4, an oxygen gas supply unit 5, and a carbon dioxide gas supply unit 6 is disposed so as to be partially immersed in the molten salt 20. The oxygen gas supply unit 5 is intended to supply an oxygen-containing gas to the oxygen gas reduction electrode 8 to generate oxide ions in the molten salt 20, and the carbon dioxide gas supply unit 6 is intended to supply a carbon dioxide-containing gas into the molten salt 20 to generate carbonate ions. In addition, the pair of carbon deposition fuel electrode 3 and oxygen gas generation electrode 4 and the pair of carbon deposition fuel electrode 3 and oxygen gas generation electrode 4 are electrically connected to each other, and a power supply that applies, between the carbon deposition fuel electrode 3 and the oxygen gas generation electrode 4, a voltage at which carbonate ions are reduced to deposit carbon on the carbon deposition fuel electrode 3 is connected to the pair of carbon deposition fuel electrode 3 and oxygen gas generation electrode 4.

A. Carbon Dioxide Electrolysis/Carbon Fuel Cell-Integrated Apparatus

1. Electrolytic Bath

According to the present embodiment, in order to make carbonate ions ($CO_3^{2-}$) and oxide ions ($O^{2-}$) present stably in the electrolytic bath 20, an alkali metal halide or an alkaline earth metal halide, or a mixture thereof can be used as a main molten salt. In the case of use as a carbon dioxide electrolysis apparatus (electric power storage), $CO_3^{2-}$ is supplied into the electrolytic bath in accordance with the reaction of the formula (1) by adding an $O^{2-}$ source first and further blowing carbon dioxide, and thus, the reactions of the formulas (2) and (3) can be smoothly promoted. On the other hand, in the case of use as a carbon fuel cell (power generation), the cell reactions of the formulas (5) and (6) can be smoothly promoted by adding an $O^{2-}$ source as well. More specifically, it is preferable to add an $O^{2-}$ source in advance to the carbon dioxide electrolysis/carbon fuel cell-integrated apparatus. The same amounts of oxide ions ($O^{2-}$) consumed by the formula (3) for the carbon dioxide electrolysis and the formula (6) for the carbon fuel cell are supplied respectively as the reactions of the formula (2) and formula (5) proceed, and thus, the concentration of $O^{2-}$ in the electrolytic bath is in principle kept constant in the overall reaction.

In this regard, compound such as LiF, NaF, KF, RbF, CsF, LiCl, NaCl, KCl, RbCl, CsCl, LiBr, NaBr, KBr, RbBr, CsBr, LiI, NaI, KI, RbI, and CsI can be used as the alkali metal halide, and, $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, and $BaI_2$ can be used as the alkaline earth metal halide.

Sources of oxide ions ($O^{2-}$) include alkali metal oxides and alkaline earth metal oxides, and oxides such as $Li_2O$, $Na_2O$, and $K_2O$ can be used as alkali metal oxides, and oxides such as MgO, CaO, and BaO can be used as alkaline earth metal oxide.

It is to be noted that it is also possible to add, instead of the $O^{2-}$ source, $CO_3^{2-}$ to the above-mentioned molten salt, or use a carbonate containing carbonate ions ($CO_3^{2-}$) as a main molten salt. In this case, $O^{2-}$ is produced by the reverse reaction of the formula (1) depending on the bath composition and the bath temperature, and in order to cause the oxygen evolution reaction of the formula (3) for the carbon dioxide electrolysis and the formula (6) for the carbon fuel cell to proceed smoothly, it is preferable to supply in advance $O^{2-}$ sufficiently to the electrolytic bath by the reaction of the formula (2), because it is advantageous for the $O^{2-}$ concentration is higher. In particular, in a condition in which the $O^{2-}$ concentration in the electrolytic bath is low, the chlorine evolution reaction of the following formula may proceed as an anodic reaction, in addition to the oxygen gas generation of the formula (3).

Anodic reaction: $2Cl^- \rightarrow Cl_2 + 2e^-$ (8)

Attention is required, because the generation of chlorine gas during the operation of the carbon dioxide electrolysis/carbon fuel cell-integrated apparatus may have adverse effects such as deterioration of the mass balance of ions in the bath and structural material degradation.

Examples of the molten salt containing carbonate ions ($CO_3^{2-}$) include alkali metal carbonates and alkaline earth metal carbonates. As the alkali metal carbonates, carbonates such as $Li_2CO_3$, $Na_2CO_3$, and $K_2CO_3$ can be used, and as the alkaline earth metal carbonates, carbonates such as $MgCO_3$, $CaCO_3$, and $BaCO_3$ can be used.

The above-mentioned compounds can be used alone, or two or more thereof can be used in combination. Further, the combination of these compounds, the number of compounds to be combined, the mixing ratio, and the like are also not limited, and can be selected appropriately depending on a preferred operating temperature range.

Furthermore, the electrolytic bath (molten salt 20) may also rapidly supply carbonate ions ($CO_3^{2-}$) or oxide ions ($O^{2-}$) to the vicinity of a specific electrode for the purpose of accelerating each electrode reaction, or conversely, in order to dissipate the ions rapidly from the vicinity of the electrode, the bath may be also circulated in a given direction with respect to the cathode and the anode or the positive electrode and the negative electrode with the use of an appropriate method such as inert gas blowing or stirring. In particular, in the case of causing carbon dioxide absorption and carbon electrodeposition to proceed simultaneously, it is preferable to circulate the electrolytic bath in the direction of carbon dioxide absorption unit→cathode→anode→carbon dioxide absorption unit.

The temperature (bath temperature) of the electrolytic bath composed of the molten salt 20 is not particularly limited. In general, the increased bath temperature of the electrolytic bath is more advantageous in terms of material supply and reaction promotion, but on the other hand, the molten salt evaporates significantly in the high temperature range in excess of 900° C., and the material of the electrolytic bath 2, which may be used, is limited at high temperature, thereby making it difficult to handle the electrolytic bath, and thus the actual bath temperature is preferably a processing temperature approximately from 250° C. to 800° C., and more preferably a processing temperature approximately from 350° C. to 700° C.

Figure 2:
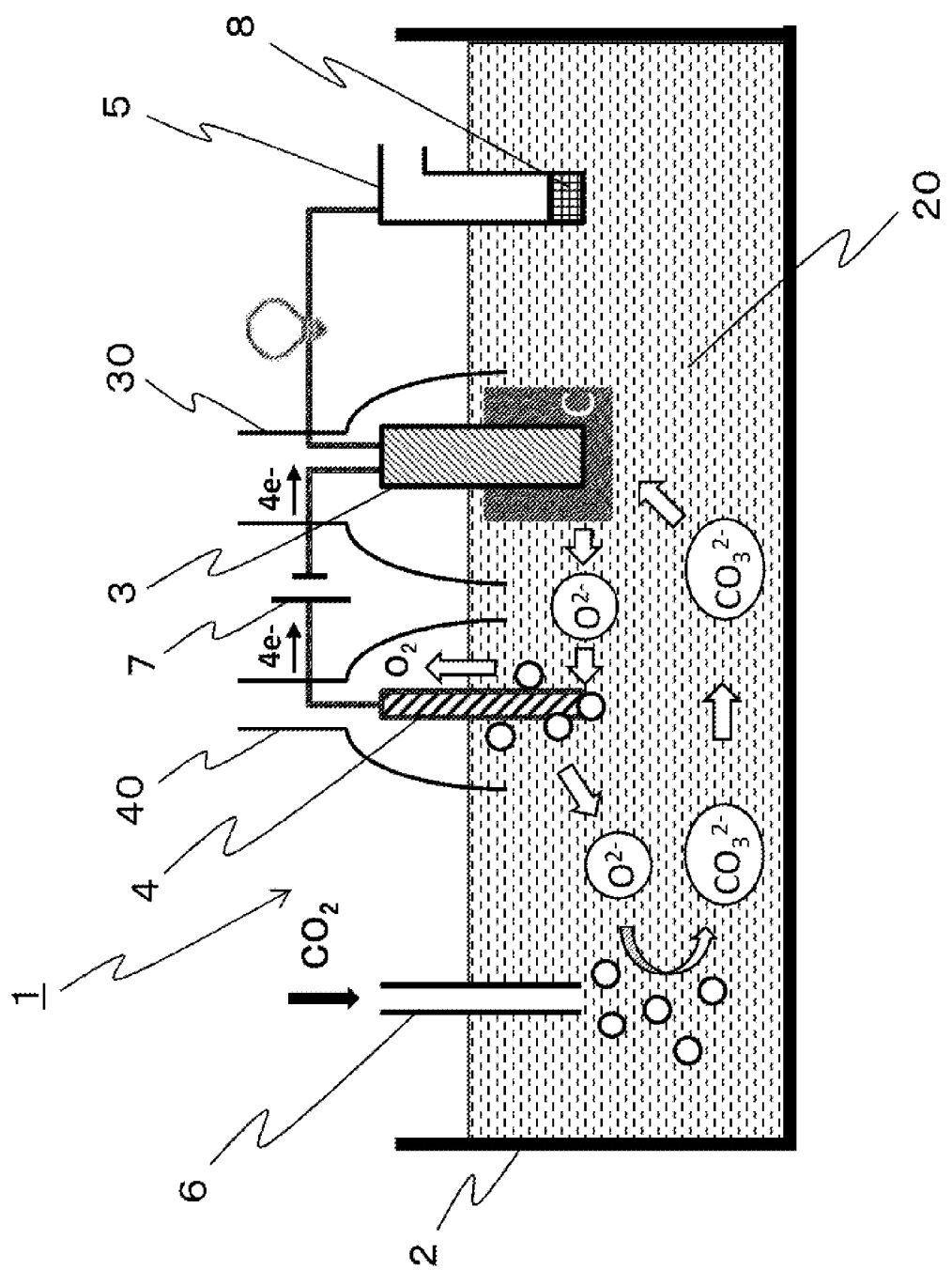
FIG. 2 is an explanatory view for explaining an aspect in the case of using the carbon dioxide electrolysis/carbon fuel cell-integrated apparatus shown in FIG. 1 as a carbon dioxide electrolysis apparatus (electric power storage).

B. In the Case of Functioning as a Carbon Dioxide Electrolysis Apparatus that Fixes and Stores Carbon Dioxide as Carbon by Molten Salt Electrolysis FIG. 2 show an explanatory view for explaining an aspect in the case of using the carbon dioxide electrolysis/carbon fuel cell-integrated apparatus 1 shown in FIG. 1 as a carbon dioxide electrolysis apparatus (electric power storage).

1. Cathode (Carbon Deposition Fuel Electrode 3)

When the carbon dioxide electrolysis/carbon fuel cell-integrated apparatus 1 according to the present embodiment functions as a carbon dioxide electrolysis apparatus that immobilizes and stores carbon dioxide as carbon by molten salt electrolysis, the supply of a carbon dioxide-containing gas to the molten salt 20 with oxide ions ($O^{2-}$) therein by the use of the carbon dioxide gas supply unit 6 causes a carbon dioxide absorption reaction of producing carbonate ions ($CO_3^{2-}$) in accordance with the formula (1) to proceed in the electrolytic bath 2.

$$\text{In molten salt: } CO_2 + O^{2-} \rightarrow CO_3^{2-} \tag{1}$$

When this carbonate ion is reduced at the carbon deposition fuel electrode 3 partially immersed in the molten salt 20, carbon is deposited on the carbon deposition/combustion electrode 3 in accordance with the formula (2), and in this regard, various carbon electrodeposits from dense to porous electrodeposits can be obtained by controlling the electrolytic conditions with a power supply that applies a voltage between the cathode and the anode as described later.

$$\text{Cathodic reaction: } CO_3^{2-} + 4e^- \rightarrow C + 3O^2 \tag{2}$$

It is to be noted that it is possible to cause the reactions of the formulas (1) and (2) (carbon dioxide blowing and electrolytic deposition of carbon) to proceed individually as completely independent stepwise reactions, or cause the reactions to proceed just simultaneously. In particular, in the case of causing these reactions to proceed simultaneously, it is preferable to circulate the bath by an appropriate method as described above.

The cathode material (carbon deposition fuel electrode 3) is not limited to metals, and it is possible to use all types of materials, as long as the materials exist stably in a solid or liquid phase and have conductivity at the processing temperature according to the present embodiment. Further, although not shown, the carbon deposition fuel electrode 3 for use in the present embodiment may be also integrated with the electrolytic bath 2 so as to constitute at least a part of the inner wall of the electrolytic bath 2.

2. Anode (Oxygen Gas Generation Electrode 4)

Some of the produced oxide ions are oxidized on the oxygen gas generation electrode 4 electrically connected to the carbon deposition fuel electrode 3 described above to produce oxygen in accordance with the formula (3).

$$\text{Anodic reaction: } 2O^{2-} \rightarrow O_2 + 4e^- \tag{3}$$

It is possible to use, as the insoluble anode (oxygen gas generation electrode 4), an electrode containing a noble metal such as platinum or gold, a conductive ceramic electrode made of nickel ferrite represented by $Ni_xFe_{3-x}O_4$ (X=0.1 to 2.0) or a nickel-cobalt oxide represented by the formula: $Ni_xCo_{1-x}O$ (X=0.1 to 0.5) of the formula: $Ni_xCo_{3-x}O_4$ (X=0.3 to 1.5), or a conductive diamond electrode.

The oxide ions ($O^{2-}$) remaining in the molten salt without being oxidized on the anode can be used in the carbon dioxide absorption reaction of the formula (1), and the formulas (1) to (3) can be summed up to the following reaction from carbon dioxide to carbon and oxygen.

$$\text{Total reaction: } CO_2 \rightarrow C + O_2 \tag{4}$$

3. Electrolytic Conditions

The electrode potential or electrolytic current is controlled with a power supply 7 such that the electrode potential during the electrolysis falls within the potential region where carbonate ions ($CO_3^{2-}$) are reduced. For example, in the case of using molten LiCl—KCl with a bath temperature of approximately 500° C. for the electrolytic bath, it is preferable to carry out the electrolysis at a potential that is lower potential than about 1.2 V ($Li^+/Li$ reference) at which a reductive reaction of $CO_3^{2-}$ is seen, and that is a potential at which Li metal is not deposited (a potential that is higher than about 0 V).

4. Conditions for Blowing Carbon Dioxide-Containing Gas

As the carbon dioxide-containing gas blown into the carbon dioxide gas supply unit 6, exhaust gas from a thermal power plant or the like can be assumed. As a gas component contained other than carbon dioxide, inert gas such as argon and nitrogen can be contained without any problem, but there is a possibility that water, $NO_x$, and $SO_x$ may be dissolved in various ion forms, thereby decreasing the efficiency of carbon electrodeposition at the cathode, and water, $NO_x$, and $SO_x$ should be thus preferably eliminated in advance. Oxygen can be contained without any problem, as long as the apparatus is designed such that no blown gas comes into direct contact with the cathode.

In addition, since the reaction of producing carbonate ions ($CO_3^{2-}$) from carbon dioxide and oxide ions ($O^{2-}$) proceeds as a gas-liquid reaction, the specific surface area per unit volume is expanded to improve the reactivity as the bubble size (bubble diameter) of the carbon dioxide-containing gas is smaller and smaller. Accordingly, the bubble diameter of the carbon dioxide-containing gas depends on the temperature of the molten salt, the $O^{2-}$ concentration, the number of bubbles of the carbon dioxide-containing gas, and the like, and the preferred bubble diameter of the carbon dioxide-containing gas can be determined appropriately depending on the size of the carbonate generation unit, the magnitude of the electrolytic current, and the like.

The bubble diameter of the carbon dioxide-containing gas is, although not critical, preferably approximately 100 nm to 10 mm, and more preferably approximately 1 µm to 1 mm. It is to be noted that the bubble diameter herein refers to a bubble diameter in or immediately after supplying the carbon dioxide-containing gas to the molten salt 20, and the diameter is reduced as the reaction with the oxide ions ($O^{2-}$) proceeds. Further, the number of bubbles of the carbon dioxide-containing gas contained per unit volume may also be determined by the temperature of the molten salt, the $O^{2-}$ concentration, the bubble diameter of the carbon dioxide-containing gas, and the like.

The method of making the bubbles of the carbon dioxide-containing gas fine is not particularly limited. For example, in the case of desiring to generate bubbles on the order of micrometers, the purpose is achieved by passing through a porous member made of Pyrex (registered trademark), quartz, silicon nitride, silicon carbide, boron nitride, or alumina. In addition, in the case of desiring to generate fine bubbles on the order of submicrometers, the bubbles of the carbon dioxide-containing gas may be further made finer by the application of ultrasonic waves or the like.

The temperature of the carbon dioxide-containing gas blown by the carbon dioxide gas supply unit 6 into the molten salt 20 which serves as an electrolytic bath is not particularly limited, but in order to suppress the temperature fluctuation of the electrolytic bath, it may be preferable to heat the carbon dioxide-containing gas in a preliminary manner to near the temperature of the molten salt 20. It is to be noted that the carbon dioxide-containing gas may be heated with a heater or the like separately provided in the flow path of carbon dioxide gas, or heated with the use of heat of the molten salt 20 of the electrolytic bath by installing the flow path of the carbon dioxide-containing gas in the electrolytic bath.

It is preferable to stir the molten salt 20 for the purpose of accelerating the reaction of producing carbonate ions ($CO_3^{2-}$) from oxygen dioxide and oxide ions ($O^{2-}$). As a means for such stirring, bubbling with a carbon dioxide-containing gas or an inert gas may be used, or a stirrer (agitator) including a driving unit such as an impeller may be also used.

Further, in the carbon dioxide electrolysis/carbon fuel cell-integrated apparatus 1 according to the present embodiment, since oxygen gas is generated at the oxygen gas generation electrode 4 which serves as an anode (see the formula (2)), an oxygen gas collection unit 30 is provided which efficiently collects the oxygen gas generated at the electrode 4. This case has the advantage that the collected oxygen gas can be reused, for example, for the reaction shown by the formula (5), and the like.

C. In the Case of Functioning as a Carbon Fuel Cell that Extracts Electric Power with Carbon as a Fuel 1. Positive Electrode (Oxygen Gas Reduction Electrode 8)

Figure 3:
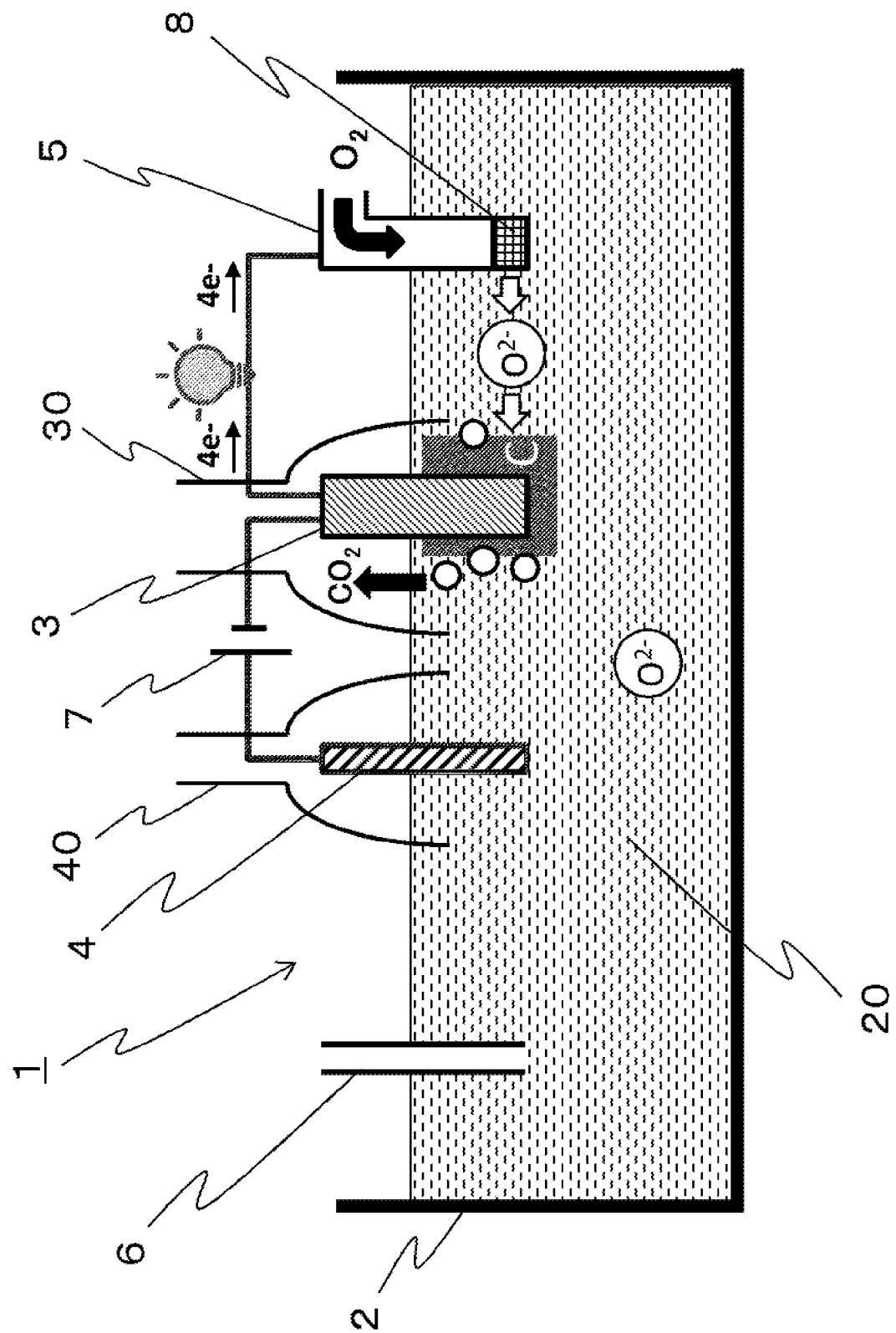
FIG. 3 is an explanatory view for explaining an aspect in the case of using the carbon dioxide electrolysis/carbon fuel cell-integrated apparatus shown in FIG. 1 as a carbon fuel cell (power generation).

FIG. 3 show an explanatory view for explaining an aspect in the case of using the carbon dioxide electrolysis/carbon fuel cell-integrated apparatus 1 shown in FIG. 1 as a carbon fuel cell (power generation).

When the carbon dioxide electrolysis/carbon fuel cell-integrated apparatus 1 according to the present embodiment functions as a carbon fuel cell that extracts electric power with carbon as a fuel, the supply of an oxygen-containing gas by the oxygen gas supply unit 8 to the oxygen gas reduction electrode 8 which serves as a positive electrode causes the reduction of oxygen to proceed at the positive electrode in accordance with the formula (5) in the electrolytic bath 2.

Positive electrode reaction: $O_2+4e^-\rightarrow 2O^{2-}$ (5)

As a component other than oxygen contained in the oxygen-containing gas blown by the oxygen gas supply unit 5, inert gas such as argon and nitrogen can be contained without any problem. Carbon dioxide, which does not interfere with the reaction in the bath, should be preferably removed in advance because the mass balance of carbon is lost. Water should be also preferably removed because there is a possibility that water may turn into oxide ions ($O^{2-}$) or hydroxide ions (OH), thereby causing an unintended reaction on the electrode.

2. Negative Electrode (Carbon Deposition Fuel Electrode 3)

Further, at the carbon deposition fuel electrode 3 electrically connected to the oxygen gas reduction electrode 8, which serves as a negative electrode, carbon dioxide is produced from the carbon of the carbon deposition fuel electrode 3 and oxide ions in the molten salt 20 in accordance with the formula (6).

Negative electrode reaction: $C+2O^{2-}\rightarrow CO_2+4e^-$ (6)

The sum of the formulas (5) and (6) results in the reaction of producing carbon dioxide from carbon and oxygen as in the following formula (7).

Total reaction: $C+O_2\rightarrow CO_2$ (7)

In the carbon dioxide electrolysis/carbon fuel cell-integrated apparatus 1 according to the present embodiment, a carbon dioxide gas collection unit 30 is provided which efficiently collects the carbon dioxide gas (see the formula (6)) produced at the carbon deposition fuel electrode 3 which serves as a negative electrode. It is to be noted that the carbon dioxide produced at the negative electrode has to be promptly discharged into the gas phase out of contact with $O^{2-}$, because the carbon dioxide produces carbonate ions ($CO_3^{2-}$) on coming into contact with the oxide ions ($O^{2-}$) in the bath. In addition, the $O^{2-}$ ion concentration in the bath is preferably kept low enough to prevent contact with carbon dioxide in the vicinity of the negative electrode. The produced $CO_3^{2-}$ can be used for the carbon electrodeposition reaction of the formula (2) when the carbon dioxide electrolysis/carbon fuel cell-integrated apparatus 1 functions as a carbon dioxide electrolysis apparatus, but will interfere with the carbon dioxide absorption reaction of the formula (1), and it is thus not preferable to produce $CO_3^{2-}$ at this stage.

3. Power Generation Efficiency of Carbon Fuel Cell

In the carbon dioxide electrolysis/carbon fuel cell-integrated apparatus 1 according to the present embodiment, the power generation efficiency in the case of use as a carbon fuel cell can be calculated by multiplying the ratio ($\Delta G/\Delta H$) of the Gibbs energy change ($\Delta G$) of a combustion reaction converted to electric power to the enthalpy change ($\Delta H$) thereof, by the fuel utilization factor and the voltage efficiency. In the case of using solid carbon for the fuel, however, the ratio $\Delta G/\Delta H$ is close to 1 even at high temperatures, and it is easy to make the fuel utilization factor close to 1 as compared with gaseous hydrogen. Thus, the carbon dioxide electrolysis/carbon fuel cell-integrated apparatus 1 according to the present embodiment is expected to achieve a higher power generation efficiency as compared with hydrogen.

Table 1 shows the ratio ($\Delta G/\Delta H$), and expected fuel utilization factor and power generation efficiency in an electrochemical combustion reaction of hydrogen and carbon in the carbon dioxide electrolysis/carbon fuel cell-integrated apparatus 1 according to the present embodiment. It is to be noted that the same value of 0.8 is used for the voltage efficiency. In the case of using solid carbon for the fuel, the ratio $\Delta G/\Delta H$ is close to 1 even at high temperatures, and it is easy to make the fuel utilization factor close to 1 as compared with gaseous hydrogen. Thus, as compared with the case of hydrogen (0.54), a very high power generation efficiency of 0.80 can be expected that to be achieved.

TABLE 1

| Combustion reaction | $\Delta G/\Delta H$ (923 K) | Fuel utilization factor | Voltage efficiency | Power generation efficiency |
|---|---|---|---|---|
| $H_2 + 1/2O_2(g)\rightarrow H_2O(g)$ | 0.80 | 0.85 | 0.80 | 0.54 |

TABLE 1-continued

| Combustion reaction | ΔG/ΔH (923 K) | Fuel utilization factor | Voltage efficiency | Power generation efficiency |
|---|---|---|---|---|
| C + O$_2$(g)→ CO$_2$(g) | 1.00 | 1.00 | 0.80 | 0.80 |

Reference: Ihara Manabu, Hydrogen Energy System, 36 (2), 17 (2011)

Figure 4:
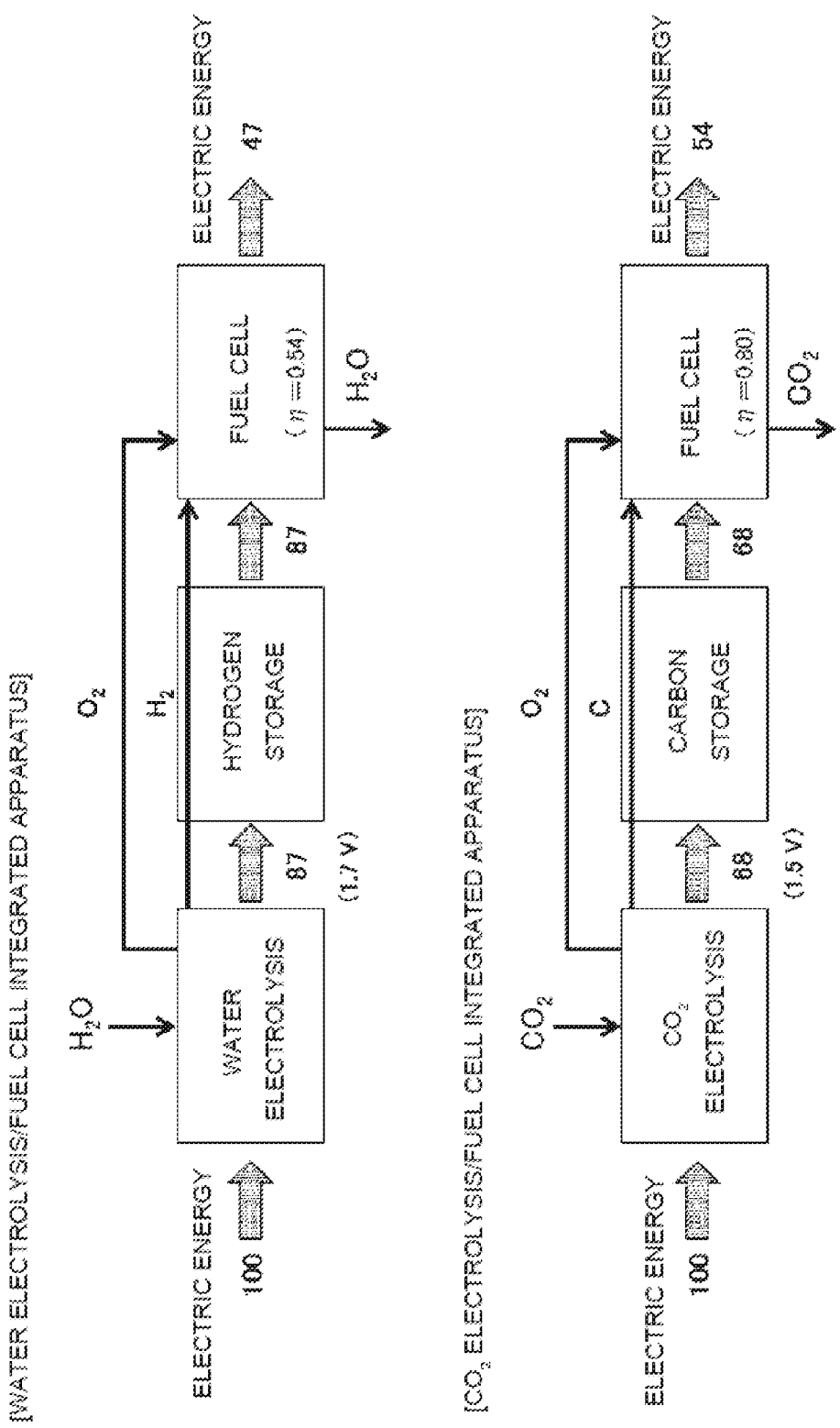
FIG. 4 is an energy/material flow diagram in the case of operating a water electrolysis/hydrogen fuel cell-integrated apparatus with hydrogen as an energy carrier and the carbon dioxide electrolysis/carbon fuel cell-integrated apparatus shown in FIG. 1 with carbon as an energy carrier.

FIG. 4 shows an energy/material flow diagram in the case of operating a water electrolysis/hydrogen fuel cell-integrated apparatus with hydrogen as an energy carrier and the carbon dioxide electrolysis/carbon fuel cell-integrated apparatus 1 with carbon as an energy carrier. The energy efficiency (87%, electrolysis voltage: 1.7 V) of the water electrolysis apparatus uses the highest value of current industrial electrolysis, and the value (68%, electrolysis voltage: 1.5 V) of the carbon dioxide electrolysis apparatus is set on the basis of an actually measured value in the carbon electrodeposition experiment made by the applicant. The calculated ratio (total efficiency) of electric energy that can be extracted from the carbon fuel cell to electric energy input for water electrolysis/CO$_2$ electrolysis is 54% in the case of the carbon dioxide electrolysis/carbon fuel cell-integrated apparatus, and it is determined that the ratio is significantly higher than 47% in the case of the water electrolysis/fuel cell-integrated apparatus.

As described above, the carbon dioxide electrolysis/carbon fuel cell-integrated apparatus 1 according to the present embodiment is characterized by being capable of implementing, as a method for using the apparatus, two steps involving totally opposite reactions of: a carbon electrodeposition step (electric storage step) of supplying the carbon dioxide-containing gas from the carbon dioxide gas supply unit 6 into the molten salt 20, and applying, between the carbon deposition/fuel electrode 3 and the oxygen gas generation electrode 4, a voltage at which the carbonate ions are reduced to deposit carbon on the carbon deposition fuel electrode 3, with the power supply 7; and further a power generation step of supplying an oxygen-containing gas from the oxygen gas supply unit 5 to the oxygen gas reduction electrode 8 to produce oxide ions in the molten salt 20, and generating a carbon dioxide gas on the carbon deposited on the carbon deposition fuel electrode 3.

D. Carbon Utilization-Type Energy System Including the Carbon Dioxide Electrolysis/Carbon Fuel Cell-Integrated Apparatus FIG. 5 shows a schematic view schematically illustrating a carbon utilization-type energy system including the carbon dioxide electrolysis/carbon fuel cell-integrated apparatus 1 shown in FIG. 1.

Figure 5:
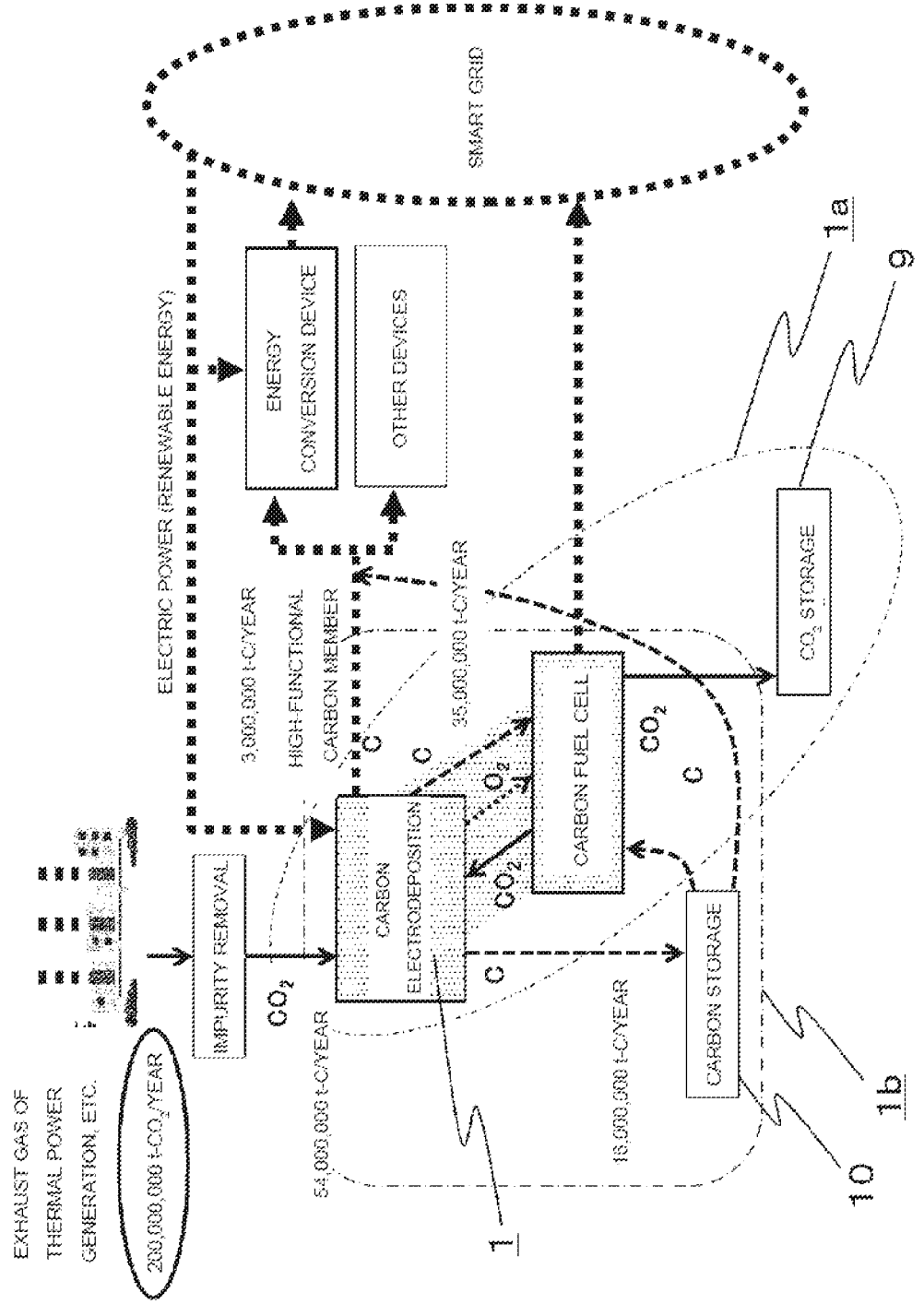
FIG. 5 is a schematic view schematically illustrating a carbon utilization-type energy system including the carbon dioxide electrolysis/carbon fuel cell-integrated apparatus shown in FIG. 1.

As understood with reference to FIG. 5, according to the present embodiment, a carbon utilization-type energy system A (1a) can be configured with the addition of a carbon dioxide gas storage unit 9 that stores carbon dioxide gas generated at the carbon deposition fuel electrode 3 to the above-described carbon dioxide electrolysis/carbon fuel cell-integrated apparatus 1. In the carbon utilization-type energy system A (1a), it is assumed that a high concentration of carbon dioxide gas (see the formula (7)) generated in the case of using the system as a carbon fuel cell is stored in the ground.

In addition, according to the present embodiment, a carbon utilization-type energy system B (1b) can be configured with the addition of a carbon storage unit 10 that stores carbon produced at the carbon deposition fuel electrode 3 to the above-described carbon dioxide electrolysis/carbon fuel cell-integrated apparatus 1. The carbon utilization-type energy system B (1b) allows the carbon (see the formula (4)) produced in the case of using the system as a carbon dioxide electrolysis apparatus to be utilized as a solid fuel for carbon fuel cell (see the formula (7)) or a high-functional carbon material.

FIG. 5 also shows an example of the flow of carbon and carbon dioxide and in the "carbon utilization-type energy system" and electric energy, which are assumed in 2050.

In order to achieve the target (80%) for the reduction of carbon dioxide emissions in 2050, it is estimated that it is necessary to achieve 50% as the ratio of renewable energy to the total electric power energy (1 billion MWh), and a carbon dioxide throughput of 200 million t-CO$_2$/year in the use and storage of collected carbon dioxide (Carbon dioxide Capture, Utilization & Storage: CCUS). Converting all of the 200 million t-CO$_2$/year of carbon dioxide into carbon in the "carbon utilization-type energy system" will produce 54 million t-C/year of carbon.

The carbon obtained by electrolysis in the "carbon utilization-type energy system" is expected to fulfill three roles of: "use as a high-functional carbon material for energy conversion devices and the like", "use as a solid fuel for fuel cell", and "storage in a solid carbon state". Among the roles, the carbon used as solid fuel for fuel cell is discharged as a high concentration of carbon dioxide during power generation, but this carbon dioxide can also be cyclically used as a carbon raw material, and can also be stored in the ground as a high concentration of carbon dioxide.

As shown in FIG. 5, the production amount of the high-functional carbon material is expected to be 3 million t-C/year in 2050. Next, assuming that the carbon dioxide electrolysis/carbon fuel cell-integrated apparatus 1 of 100 MW class according to the present invention carries out carbon dioxide electrolysis on average for half a day (12 hours), and for the other half, generates power with the obtained carbon, thereby temporarily storing 50% of the renewable energy generation, this system will be introduced for about 600 units, and the amount of carbon used for power generation in the apparatus will be 35 million t-C/year. This carbon is converted to a high concentration of carbon dioxide during power generation, and storing the carbon dioxide in the ground can directly contribute to the reduction of carbon dioxide (1a).

Finally, the amount stored in solid carbon state will be 16 million t-C/year. Converting carbon dioxide into solid carbon for the storage of the carbon requires, by simple calculation, more energy as compared with the storage in the ground, but for the storage in the ground, it is necessary to inject carbon dioxide into a groundwater aquifer at a depth of 1000 m or more from the surface of the ground, and the formation is limited which is suitable for stably storing carbon dioxide over a long period of time. In contrast, the density of carbon is approximately three times higher even as compared with carbon dioxide under high pressure (in the ground), and since the weight of carbon contained in carbon dioxide is 12/44, the volume of the carbon can be reduced to 1/10 or less of the volume of carbon dioxide under high pressure (in the ground). Furthermore, considering that the storage is possible anywhere without the need for high pressure, and the use is possible as fuels and various raw materials depending on the situation, the storage of carbon dioxide converted to solid carbon can be an adequate choice as a viable option for carbon dioxide reduction in the atmosphere (1b).

As described above, the carbon utilization-type energy system A (1a) including the carbon dioxide gas storage unit 9 and the carbon utilization-type energy system B (1b) including the carbon storage unit 10 are configured with the carbon dioxide electrolysis/carbon fuel cell-integrated apparatus 1 according to the present invention as a core technology, and furthermore, the carbon utilization-type energy systems A, B (1a, 1b) according to the present invention are combined, via a smart grid or the like, with thermal power generation, or power generation with natural energy such as sunlight and wind power. Then, the use of the obtained carbon as a fuel (energy carrier) for a power generation device that directly uses a solid carbon fuel makes it possible to stabilize the electric power system, and furthermore, promote the use and storage of collected carbon dioxide (CCUS).

REFERENCE SIGNS LIST 1 carbon dioxide electrolysis/carbon fuel cell-integrated apparatus
1a carbon utilization-type energy system A
1b carbon utilization-type energy system B
2 electrolytic bath
20 molten salt
3 carbon deposition/fuel electrode
30 carbon dioxide gas collection unit
4 oxygen gas generation electrode
40 oxygen gas collection unit
5 oxygen gas supply unit
6 carbon dioxide gas supply unit
7 power supply
8 oxygen gas reduction electrode
9 carbon dioxide gas storage unit
10 carbon storage unit

The invention claimed is:

1. A carbon dioxide electrolysis/carbon fuel cell-integrated apparatus comprising:
   an electrolytic bath that houses a molten salt containing oxide ions;
   a carbon deposition fuel electrode that is at least partially immersed in the molten salt;
   an oxygen gas generation electrode that is at least partially immersed in the molten salt to be electrically connected to the carbon deposition fuel electrode;
   an oxygen gas reduction electrode that is at least partially immersed in the molten salt;
   a carbon dioxide gas supply unit that supplies a carbon dioxide-containing gas into the molten salt to produce carbonate ions;
   a power supply that applies, between the carbon deposition fuel electrode and the oxygen gas generation electrode, a voltage at which the carbonate ions are reduced to deposit carbon on the carbon deposition fuel electrode; and
   an oxygen gas supply unit that supplies an oxygen-containing gas to the oxygen gas reduction electrode to generate oxide ions in the molten salt.

2. The carbon dioxide electrolysis/carbon fuel cell-integrated apparatus according to claim 1, the apparatus comprising an oxygen gas collection unit that collects an oxygen gas generated at the oxygen gas generation electrode.

3. The carbon dioxide electrolysis/carbon fuel cell-integrated apparatus according to claim 1, the apparatus comprising a carbon dioxide gas collection unit that collects a carbon dioxide gas generated at the carbon deposition fuel electrode.

4. The carbon dioxide electrolysis/carbon fuel cell-integrated apparatus according to claim 1, wherein the carbon deposition fuel electrode constitutes at least a part of an inner wall of the electrolytic bath.

5. The carbon dioxide electrolysis/carbon fuel cell-integrated apparatus according to claim 1, wherein the molten salt contains at least one of an alkali metal halide and an alkaline earth metal halide.

6. The carbon dioxide electrolysis/carbon fuel cell-integrated apparatus according to claim 1, wherein the molten salt contains at least one of an alkali metal carbonate and an alkaline earth metal carbonate.

7. A system comprising:
   the carbon dioxide electrolysis/carbon fuel cell-integrated apparatus according to claim 1; and
   a carbon dioxide gas storage unit that stores a carbon dioxide gas generated at the carbon deposition fuel electrode.

8. A system comprising:
   the carbon dioxide electrolysis/carbon fuel cell-integrated apparatus according to claim 1; and
   a carbon storage unit that stores carbon generated at the carbon deposition fuel electrode.

9. A method for using the carbon dioxide electrolysis/carbon fuel cell-integrated apparatus according to claim 1, the method comprising:
   a carbon electrodeposition step of supplying a carbon dioxide-containing gas from the carbon dioxide gas supply unit into the molten salt, and applying, between the carbon deposition fuel electrode and the oxygen gas generation electrode, a voltage at which the carbonate ions are reduced to deposit carbon on the carbon deposition fuel electrode, with the power supply; and
   a power generation step of supplying an oxygen-containing gas from the oxygen gas supply unit to the oxygen gas reduction electrode to produce oxide ions in the molten salt, and generating a carbon dioxide gas on the carbon deposited on the carbon deposition fuel electrode.

* * * * *